A. VORIS.
CAMERA.
APPLICATION FILED DEC. 31, 1912.
1,081,173.
Patented Dec. 9, 1913.
4 SHEETS—SHEET 1.
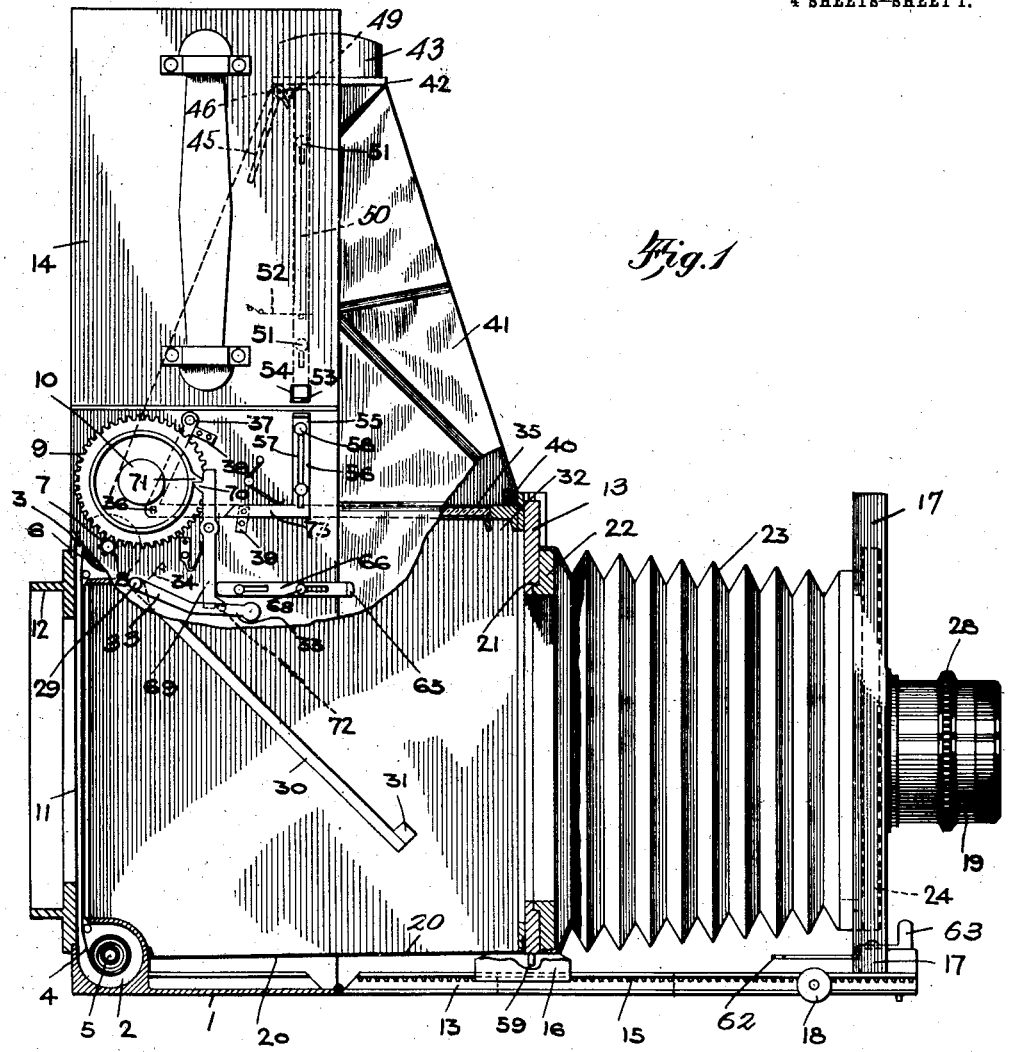
WITNESSES
F. D. Sweet.
A. L. Kitchin.
INVENTOR
Anthony Voris
BY Munn & Co
ATTORNEYS

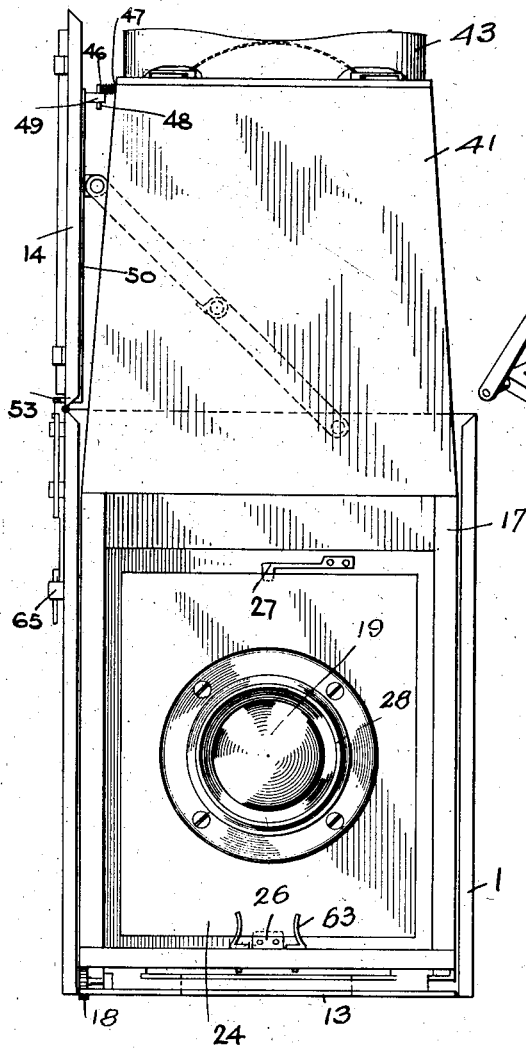
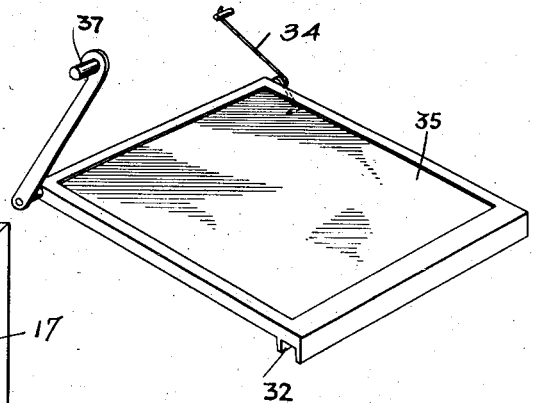
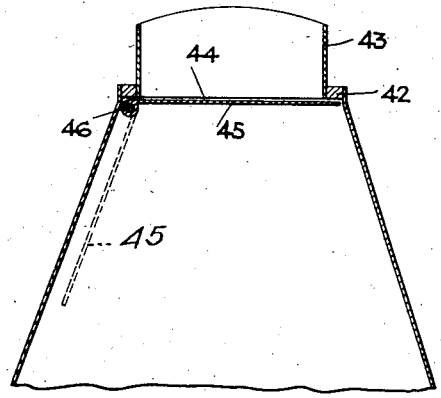

A. VORIS.
CAMERA.
APPLICATION FILED DEC. 31, 1912.
1,081,173.
Patented Dec. 9, 1913.
4 SHEETS—SHEET 3.
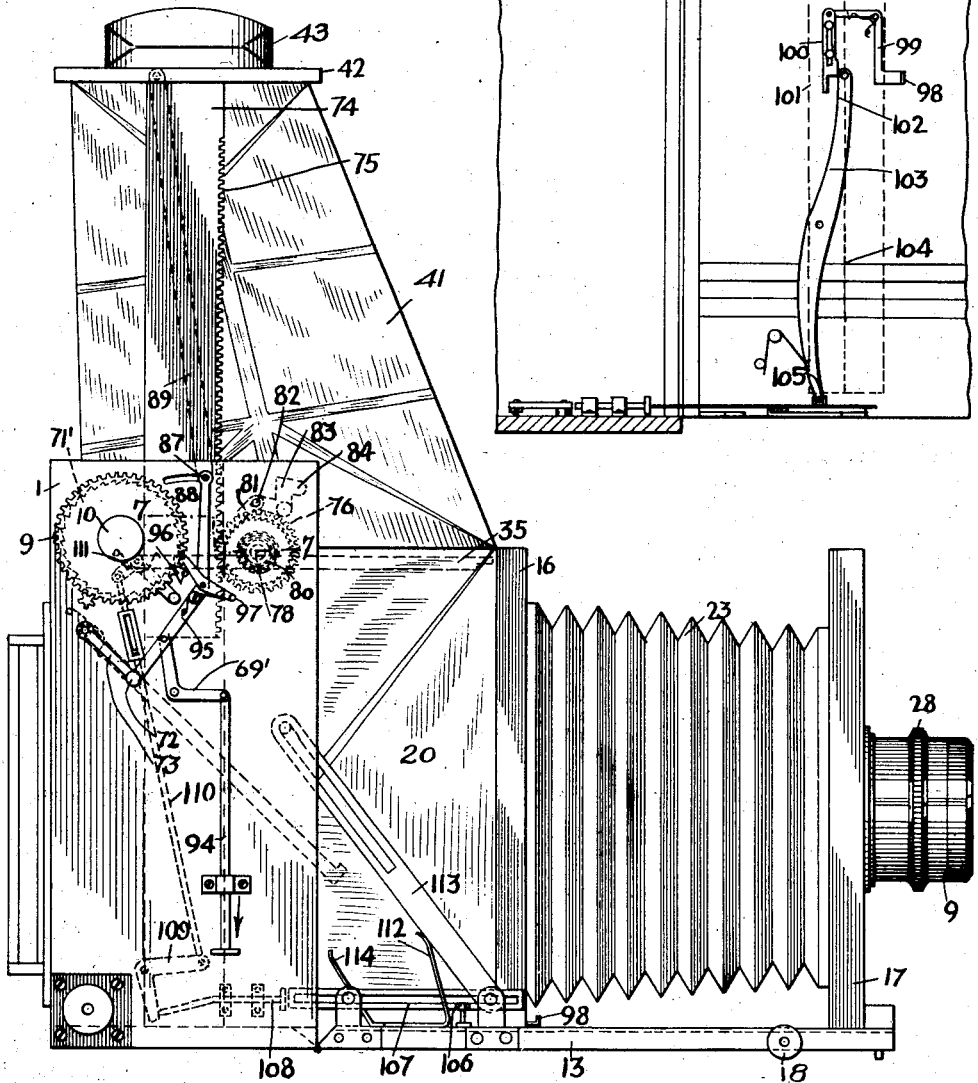
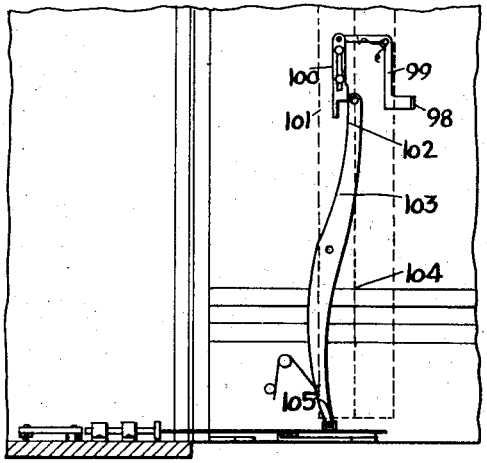
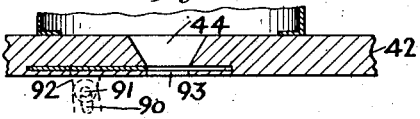
WITNESSES
F. D. Swart
A. L. Kitchin
INVENTOR
Anthony Voris,
BY
ATTORNEYS

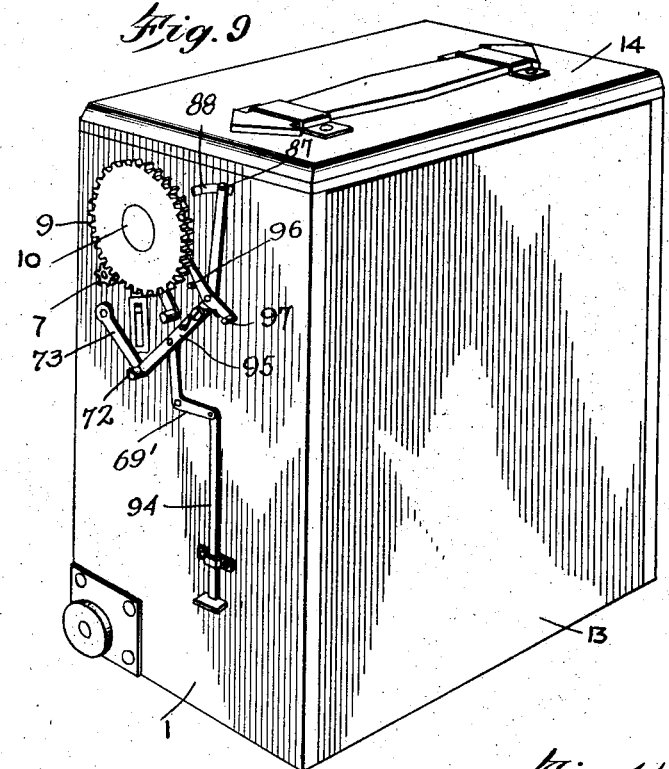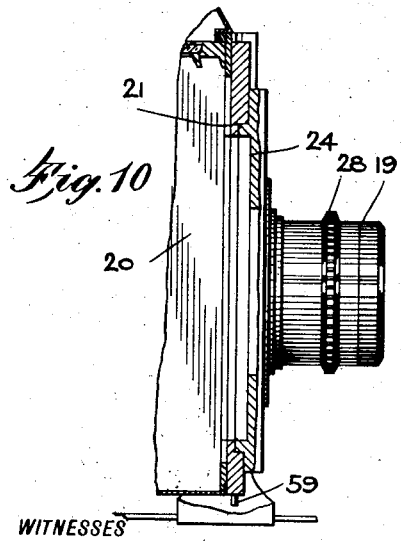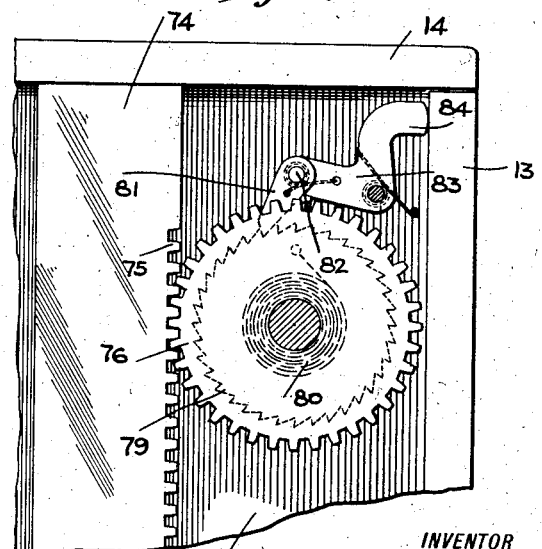

UNITED STATES PATENT OFFICE.

ANTHONY VORIS, OF NEW YORK, N. Y.

CAMERA.

1,081,173.  Specification of Letters Patent.  Patented Dec. 9, 1913.

Application filed December 31, 1912. Serial No. 739,470.

*To all whom it may concern:*

Be it known that I, ANTHONY VORIS, a citizen of the United States, and a resident of the city of New York, borough of Manhattan, in the county and State of New York, have invented a new and Improved Camera, of which the following is a full, clear, and exact description.

This invention relates to photographic apparatus, particularly to devices having a reflecting mirror and a focusing plate, which will permit the operator to view a full sized image.

A further object of the invention is to provide an apparatus which may be folded into a compact casing or housing when not in use, and which may be unfolded or extended for taking a comparatively large negative when in use.

A still further object of the invention is to provide a reflecting camera construction having improved means for automatically and quickly moving the reflecting mirror from a position in front of the curtain immediately before the exposure.

A still further object of the invention is to provide an improved apparatus in which a plaited bellows may be used for long distance focusing, the same being arranged with a front or lens-carrying plate which may be disconnected from the bellows and connected directly to a folding bellows, whereby a short focus or wide range camera is produced.

In carrying out the objects of the invention, a comparatively small housing of rigid material is provided, in which is arranged a folding bellows having a front of any desired kind, into which may be fitted the front lens-carrying plate of a plaited bellows. When the plaited bellows is used, a suitable track for the front thereof is provided, whereby a proper adjustment or focus may be had for the lens. When the lens is connected directly to the front of the folding bellows, the same is adjusted in the usual manner. Arranged in the folding bellows and at about an angle of 45° to the beam of light extending from the lens, is a reflecting mirror for reflecting the image onto a ground glass or focusing plate which is arranged at the top of the folding bellows. A suitable hood is connected to the top of the folding bellows having an observation opening so that the focus may be properly secured. Associated with the observation opening and with the reflecting mirror are a plurality of improved means for shifting the position of the mirror, and for closing the observation opening when an exposure is taken.

A practical embodiment of the invention is represented in the accompanying drawings forming a part of this specification, in which similar characters of reference indicate corresponding parts in all the views.

Figure 1 is a side view of an embodiment of the invention, certain parts of the housing and folding bellows being shown in section; Fig. 2 is a front view of the structure shown in Fig. 1; Fig. 3 is a detail perspective view of the ground glass and associated parts; Fig. 4 is an enlarged fragmentary view showing the upper part of the hood and observation opening; Fig. 5 is a side view of a slightly modified form of the invention; Fig. 6 is a fragmentary top plan view of the front of the camera shown in its lowered position, the closing mechanism being shown in connection therewith; Fig. 7 is a section through Fig. 5 on the line 7—7, the same being shown on an enlarged scale; Fig. 8 is a fragmentary longitudinal vertical section through the observation opening and associated parts; Fig. 9 is a perspective view of the camera shown in Fig. 5 in a closed position; Fig. 10 is a detail view showing the lens adjusted to the short focusing bellows; Fig. 11 is a detail fragmentary view showing the hood locking device and associated parts of the form of the invention shown in Fig. 5; and Fig. 12 is an enlarged fragmentary side view of a rack and gearing embodying certain features of the invention.

Referring to the accompanying drawings by numerals, 1 indicates a housing constructed of wood, or any other desired material, having suitable chambers 2 and 3 in which are arranged spools on which the shutter or curtain 4 is wound. The roller 5 is spring-actuated in the usual manner of rollers of this kind, while the roller 6 is connected with a shaft 7 carrying a pinion 8 meshing with a gear wheel 9. The gear wheel 9 is provided with a thumb member 10 which is operated manually for winding the spring of the roller 5. When the gear wheel 9 is released, as hereinafter fully described, the spring-controlled roller 5 will operate the same and draw the curtain 4 past an opening 11.

The construction of the curtain and associated parts as described, is of the usual form so that no additional description thereof will be necessary. This curtain is used in connection with a plate rack 12 which is adapted to receive plates in any usual or desired way, the particular construction of plate and holder therefor not forming any part of the present invention. The housing 1 is provided with a door or front member 13 and with a top 14, the front member 13 and top 14 being suitably hinged so that the same may be freely opened. The front member 13 carries the usual rack 15 on which the bottom part of the front 16 rests, which in turn carries the front 17. The rack 15 may be suitably adjusted by a thumb member 18 connected with suitable gearing (not shown) whereby the rack may be adjusted back and forth for adjusting the front 17 and lens 19.

The front 16 is connected with a folding bellows 20 which is secured at its inner ends to the inner end or back of the housing 1 so that the same may be folded within the housing 1. The front 16 is provided with a shoulder or offset portion 21 designed to receive a plate 22 connected with a plaited bellows 23 which is secured to the front 17. A lens-carrying plate 24 is mounted in the front 17 and held therein by any desired means, as for instance a stop 26 and spring 27. When it is desired to use long distance focusing, the arrangement shown in Fig. 1 is used, but when it is desired to have a wide focus or a short focusing camera, the plaited bellows 23 and front 17 are removed and the plate 24 which carries the lens 19 is placed in the notch or shoulder portion 21 and secured therein in any desired manner. When this arrangement is provided the adjustment is supplied by operating the thumb member 28 in the usual manner for adjusting the lens to a limited extent whereby a proper focus may be secured.

Rigidly secured to the pivotally mounted shaft 29 is a reflecting mirror 30 provided with a stop 31 preferably of rubber, which is adapted to fit into a socket 32 when the mirror is folded. The shaft 29 extends to the exterior of the housing 1 and has secured thereto a handle or arm 33 which may be manually operated for moving the mirror to the position shown in Fig. 1, a suitable spring 34 being connected with the mirror and with a suitable stop for automatically and quickly moving the mirror from the position shown in Fig. 1 to the raised position, as for instance to the position shown in dotted lines in the modified form shown in Fig. 5. When the mirror is raised the image is thrown on the shutter or curtain 4 and as the opening therein moves past the opening 11 the image will consequently be thrown on a sensitive member in back of the curtain whereby the exposure is completed. When focusing the image will strike the mirror 30 and will be reflected to the ground glass or focusing plate 35 which carries the socket member 32 and rests against a suitable stop 40 and is pivotally supported by a shaft 36. A manually operated crank 37 is connected with the shaft 36 so that the plate 35 may be moved from the position shown in Fig. 1, to a substantially vertical position or a position parallel with the back of the camera when the camera is folded, as is shown in Fig. 8, a stop 38 being provided for holding the plate in the position shown in Fig. 1, and a stop 39 is provided for holding the plate 35 in a folded position.

Connected with the upper part of the folding bellows 20 in any desired manner is a hood 41 which is of the folding variety and which carries a top plate 42 having a suitable opening therein for accommodating the guard 43 whereby an observation opening 44 is provided. The opening 44 is adapted to be closed during the exposure by a pivotally mounted door or flap 45, the same being rigidly secured to a shaft 46 suitably mounted in the plate 42. The shaft 46 is provided with a spring 47, Fig. 2, which normally tends to close and hold closed the door or flap 45. Connected with one end of the shaft 46 is a lever 48 designed to engage a stop 49 on a reciprocating bar 50 held in place on the top 14 by suitable guides 51 operating in slots in the bar 50. A suitable spring 52 is provided which normally holds the bar 50 depressed against the action of the spring 47 so as to normally hold the door or flap 45 open. As clearly shown in Figs. 1 and 2 the bar 50 is arranged on the inner face of the top 14 but is provided with a projection or turned over portion 53 which extends through an opening 54 in the top so as to co-act with the turned over portion 55 of a slide 56. The slide 56 is provided with a slot 57 in which guides 58 operate for causing the slide to move directly up and down and at the proper time to engage and raise the bar 50 so as to permit the spring 47 to close the door or flap 45.

In opening the camera for use, the bellows 20 is first opened, and then bellows 23. In order to properly open the camera in this manner a pair of pins 59 and 60 designed to co-act with hooks 61 and 62 are pivotally mounted to the front 17. Each of these hooked members are provided with a thumb operated projection 63 which when moved together will cause the opposite ends of the hooked members to spread and consequently engage the pins 59 and 60 so that the forward movement of the hooked members and the front 17 will cause the bellows 20 to be opened up full. Upon releasing the thumb operated member 63 a spring 64 disengages the hooked members from the pins 59 and 60 so that the front 17 may be further adjusted as desired.

In operation when it is desired to make an exposure a button 65 is depressed or forced toward the rear which will cause a longitudinal movement of the bar 66. The bar 66 is provided with a pair of slots for accommodating suitable pins 68 which guide the bar in its back and forth movement. When the bar 66 is forced to the rear the same will move the pivotally mounted lever 69 so that the projection 70 will become disengaged from the projection 71 which is rigidly connected with the gear wheel 9 so that the gear wheel 9 and associated parts may freely rotate and thus permit the curtain or shutter 4 to properly move past the opening 11. Upon the first slight movement of the lever 69 the end thereof will slip off the projection 72 projecting from the arm 33 so that the arm 33 and mirror 30 may move upwardly under the action of the spring 34 until the member 31 has moved into the socket 32. This will of course permit the image to be transferred from the mirror to the shutter and the sensitive plate in the usual manner. During the upward pivotal movement of the arm 33 the same is adapted to strike against the extension 73 formed on the slide 56 and force the same together with the slide moving upwardly until the projection 55 has engaged the projection or turned over portion 53 and moved bar 50 a sufficient distance to permit the spring 47 to close the door or flap 45. It will be noted that the mirror 30 is released before the gear wheel 9 is released so that the mirror will have time to get out of the way and the door or flap 45 will have time to close previous to the operation of the shutter. When it is desired to fold the camera the arm 33 is moved downwardly pivotally until the mirror 30 is substantially in a vertical position or parallel with the back of the camera and then the plate 35 is moved similarly into a vertical position, the crank 37 being removed from the stop 38 and caused to engage the stop 39. If desired a suitable stop could be provided for the arm 33 although the same is not absolutely necessary as the plate 35 will act as a stop. After the plate 35 has been moved downward to its folded position the hood 41 is collapsed and then the bellows 20 and bellows 23 are folded or collapsed until the front 17 is within the housing 1, after which the front 13 is moved upwardly pivotally to a closed position and then the top 14 is closed. Suitable latches or catches may be provided for holding the front and the top closed without departing from the spirit of the invention. It will be observed that the construction admits of the taking of a negative of a comparatively large size while the housing into which the various parts are adapted to be folded is comparatively small.

In Figs. 5 to 8, inclusive, will be seen a slightly modified form of the invention in which similar reference characters will be used for similar parts, and additional reference characters for the additional changed construction. Referring more particularly to Fig. 5, a raising bar 74 is rigidly connected with a member 42 and is provided with a rack 75 on one edge which meshes with a gear wheel 76 pivotally mounted in the casing 1. The gear wheel 76 is loosely mounted on a stationary stub shaft 78 upon which is also loosely mounted a ratchet wheel 79 and a coiled spring 80. One end of the coiled spring 80 is connected with the shaft 78 and the other end is connected with the ratchet wheel 79 so that when the bar 74 is forced downward manually to the dotted position shown in Fig. 5, the spring will be wound. The ratchet wheel 79 is rigidly secured to the gear wheel 76 by any desired means, as for instance bolts or rivets, or by being formed integral therewith, so as to turn therewith, and the spring 80 is mounted in such a direction as to be brought under tension when the bar 74 is forced downward and to turn gear wheel 76 in such a direction as to force the bar 74 upward or outward when the ratchet wheel 79 is released. A pivotally mounted pawl 81 normally engages the ratchet wheel 79 so as to prevent a reverse movement thereof. The pawl 81 is pivotally mounted at 82 to a pivotally mounted lever 83 having a projection 84. The projection 84 extends outwardly sufficiently far to be engaged by part of the front 13 and moved pivotally when the front is closed, whereby the pawl 81 is caused to engage the ratchet wheel 79.

When it is desired to make an exposure, the bar 94 is moved downwardly. A movement in this direction of bar 94 will cause the bell crank lever 69' to actuate or move pivotally lever 95. Lever 95 has one end normally resting against the projection 72 on arm 33 so as to hold the mirror at a proper angle and when the end of lever 95 is moved from the projection 72 the mirror will move under the action of spring 34 upwardly until the lower end thereof strikes in the socket 32 of the ground glass. A continued movement of lever 95 will swing the upper end thereof so that pin 87 will move longitudinally of slot 88. The pin 87 is connected with the lever 89 so that when pin 87 is moved from one end of the slot to the other, the lever 89 will be moved pivotally so that the pin 91 projecting from bracket 92 rigidly secured to slide 93 will be moved so that the slide 93 will close the observation opening 84, a suitable slot 90 being formed in lever 89 for permitting a proper movement of the pin 91. As the upper end of the lever 95 moves so that the pin 87 will move longitudinally of the slot 88, the same will engage spring-pressed pawl 97, so as to force the same out of engagement with the ratchet wheel 71'. When pawl 97 is disengaged from ratchet wheel 71' the curtain 4 will be released for causing an exposure. It will be noted that the mirror is first released and is given time to move out of the way before the shutter or curtain is released. Also it will be observed that simultaneously with the releasing of the mirror and the shutter, the observation opening is closed.

In Fig. 6 there is disclosed in detail an improved arrangement for causing the ground glass 35 to be automatically lowered during the closing of the front 17. When it is desired to close the camera, the front 17 is moved toward the housing 1 until the same strikes the projection 98. Upon a continued movement of the front 17, the projection 98 and the substantially bell crank shaped lever 99 will be moved, whereupon the reciprocating plate 100 will be moved sufficiently to permit pin 101 to snap into notch 102. The pin 101 is mounted upon a pivotally mounted bar 103 which is pressed by spring 104 so that pin 101 will normally press against plate 100 and will also normally cause pin 105 to press against the stop 106 (Fig. 5) so as to continually urge slide 107 to release the reciprocating rod 108. When the rod 108 is moved outwardly or from the rear of housing 1, the same will release the bell crank lever 109 so as to allow spring 111' to raise the rod 110. The rod 110 is pivotally connected with a crank member 111, which in turn is rigidly connected to the pivotal supporting member of the ground glass 35, so that the longitudinal movement of the rod 110 will cause the ground glass 35 to move pivotally toward the rear of the housing 1. The movement of lever 103 is sufficient for causing a sufficient pivotal movement of ground glass 35 to permit spring 111' to press against the ground glass 35 and cause the same to move completely to a closed position. The arrangement of the extension 98, lever 103, and associated parts is merely to cause the ground glass 35 to start to move to a partially closed position so that the spring 111' may continue the closing movement of the ground glass without the necessity of manually pressing the ground glass 35 to a partially closed position. In addition to this arrangement, the spring 112 is connected with the front 13 and designed to press against the usual supporting bar 113 for holding the same in a proper position and against accidental closing. The spring 112 is provided with an extension 114 for giving an initial movement to the front 13 when the front 13 is released or unlocked.

From the above detailed description it will be observed that the hood automatically opens or expands when released, and also front 13 will automatically move to a partially open position. Also it will be observed that when the hood is depressed manually the same will remain in such position and when the fronts are moved forwardly toward the housing 1, certain mechanism will be operated for automatically lowering or moving out of the way the ground glass 35, so that in closing the camera practically only two movements are required, namely, a downward movement for closing the hood, and the closing or rearward movement for closing the front supports 16 and 17. Of course, the front 13 must be moved pivotally to its closed position, but the camera is entirely arranged as shown in Fig. 9.

Having thus described my invention I claim as new and desire to secure by Letters Patent:—

1. In a camera, a housing, a bellows connected to the rear part of said housing and adapted to extend therefrom when unfolded, a front for said bellows, a second bellows removably connected in front of said first mentioned bellows, means for connecting said front with said second mentioned bellows, means arranged on said front for supporting a lens, and means for supporting a sensitive member to receive an image formed by the lens.

2. In a camera, a housing formed with means for supporting a sensitive member, a folding bellows arranged to be folded in said housing and to extend therefrom at will, a front arranged on said bellows, a second bellows adapted to be inserted and removed at will between said front and said first mentioned bellows, and a lens fitting into said front.

3. A camera comprising a housing, means for supporting a sensitive member, and bellows arranged at one end connected with said housing adapted to be folded into said housing and extended therefrom, a front for said bellows, a second bellows connected with said front, means for supporting a lens on said second mentioned bellows, and means mounted on the front of said second mentioned bellows adapted to engage the front of said first mentioned bellows whereby said first mentioned bellows may be unfolded first and said second mentioned bellows unfolded second.

4. A camera comprising a housing, means for supporting a sensitive member, a lens, a shutter mechanism, a plurality of folding bellows, and manually operated means whereby one bellows is first caused to unfold and then another bellows is caused to unfold.

5. A camera comprising a housing, means for supporting a sensitive member, a shutter mechanism, a lens, a plurality of folding bellows, a stop projecting from the front of one bellows, and pivotally mounted means carried by another bellows adapted to engage said stop for causing the former bellows to be unfolded first when said bellows are being moved from said housing, said pivotally mounted means being in engagement with said stop.

6. A camera comprising a housing, means for supporting a sensitive member, a shutter mechanism, a lens, a plurality of folding bellows arranged in the housing, and means for unfolding the bellows in any desired sequence, said means comprising a stop projecting from the front of one of said inner bellows, and a pair of pivotally mounted hooked members connected with the front of another bellows.

7. A camera comprising a housing, means for supporting a sensitive member, a shutter mechanism, a lens, a plurality of folding bellows, and means for causing the unfolding of the bellows in any desired sequence, said means comprising a stop connected with one of said bellows and a bodily movable catch mounted on another of said bellows arranged to engage said stop.

8. A camera comprising a housing, means for supporting a sensitive member, a shutter mechanism, a lens, a plurality of folding bellows, and means for causing the bellows to be unfolded in any desired sequence, said means comprising a pair of stops projecting from the front of one of said bellows, a pair of pivotally mounted hooked members supported by the front of the second bellows, a spring for normally causing said hooked members to disengage said pin, and manually operated extensions on the said hooked members.

9. A camera comprising a housing, means for supporting a sensitive member thereon, a shutter mechanism, a lens, means for focusing the lens, a mirror for reflecting an image formed by said lens, a focusing plate for receiving said image, an observation hood formed with an observation opening, means for closing said observation opening, and means for operating said shutter mechanism adapted to release said last mentioned means.

10. A camera comprising a housing, means for supporting a sensitive member thereon, a shutter mechanism, a lens, means for adjusting said lens, a pivotally mounted focusing mirror, a spring for tending to continually move said focusing mirror from in front of said lens, means for releasing said mirror whereby said spring will move said mirror, a focusing plate, an observation hood arranged opposite the focusing plate, a door for closing the opening in said observation hood, a spring for normally tending to close said door, a reciprocating bar for normally holding said door open, and means connected with said mirror for moving said bar out of the way of said door when said shutter operating mechanism has been operated.

11. A camera comprising a housing, means for supporting a sensitive member thereon, a shutter mechanism, a plurality of bellows adapted to be folded into said housing, a lens carried by one of said bellows, a focusing hood carried by the other of said bellows, and means arranged opposite the focusing hood for producing an image adapted to be seen when looking into the hood, said hood being adapted to be folded into said housing.

12. In a camera, a housing, a plurality of focusing bellows, and a focusing hood connected with one of said focusing bellows, all of said bellows being adapted to be folded into said housing.

13. A camera comprising a housing, means for supporting a sensitive member thereon, a shutter mechanism, a bellows, a lens, means for focusing said lens, a folding focusing hood, a spring-actuated door for closing the observation opening in said focusing hood, a reciprocating bar for normally holding said door open, means for normally holding said bar in such a position as to hold said door open, a reciprocating member arranged on said housing adapted to engage said bar for moving the same out of the way of said door, a pivotally mounted mirror for throwing an image into said hood, and means for moving said mirror from opposite said lens and for simultaneously closing said observation opening in said hood.

14. A camera comprising a housing, means for supporting a sensitive member thereon, a shutter, a lens, a bellows for carrying said lens, an observation hood, and means for automatically opening or expanding said observation hood.

15. A camera comprising a housing, means for supporting a sensitive member thereon, a shutter mechanism, a lens, a folding observation hood, a reciprocating bar for supporting said observation hood, and means for locking said bar in any of its adjusted positions.

16. A camera comprising a housing, means for supporting a sensitive member thereon, a shutter mechanism, a lens, a folding observation hood, a reciprocating bar formed with a rack, said reciprocating bar being adapted to open and hold open said observation hood, and power mechanism engaging said rack for raising said bar.

17. A camera comprising a housing, means for supporting a sensitive member thereon, a shutter mechanism, a lens, a folding observation hood, a reciprocating rack connected with the observation hood at one end, a gear wheel meshing with said rack, a coiled spring having one end connected with said gear wheel, a stationary shaft connected with the opposite end of said spring, and a catch for normally preventing the rotation of said gear wheel in one direction whereby when said observation hood is folded said rack will be forced into said housing and said spring will be wound, and when said catch is released said spring will operate said gear wheel for automatically moving said rack and unfolding said hood.

18. A camera comprising a housing, means for supporting a sensitive member thereon, a shutter mechanism, a lens, a front for supporting said lens, an observation hood, a ground glass arranged adjacent the bottom of the observation hood, a pivotally mounted mirror formed with an operating crank, said pivotally mounted mirror being arranged in the rear of said lens for reflecting an image on said ground glass, a door for closing said observation opening, a pivotally mounted lever for operating said door, a second pivotally mounted lever engaging the crank connected with said mirror for normally locking the mirror against movement, means for moving said mirror pivotally from a position in the rear of said lens, means for moving said second pivotally mounted lever so as to be disengaged from said crank, and locking means for said shutter mechanism operated by said second mentioned lever for releasing said shutter mechanism substantially simultaneously with the releasing of said crank.

19. A camera comprising a housing, means for supporting a sensitive member thereon, a shutter mechanism, a lens, a hood formed with an observation opening, a ground glass arranged opposite said hood, means for reflecting an image projected through said lens on to said ground glass, means connected with said housing for moving said ground glass pivotally toward a closed position, a sliding bar for setting in motion said last mentioned means, a pivotally mounted bar arranged in front of the camera engaging said sliding bar for moving the same, a spring for tending to move said pivotally mounted bar to a predetermined position, a sliding plate formed with a notch adapted to hold said pivotally mounted bar in a predetermined position, a pin projecting from said pivotally mounted bar, and a pivotally mounted member adapted to be operated by the lens support of said camera for moving said plate longitudinally in order to bring said notch opposite said pin whereby said spring is permitted to move said bar pivotally in order to cause the same to move said ground glass pivotally toward a closed position automatically.

20. A camera comprising a housing, means for supporting a sensitive member thereon, a shutter mechanism, a lens, means for releasing said shutter mechanism when making an exposure, an observation ground glass structure, means for pivotally supporting said ground glass structure in a position substantially parallel with the light projecting through said lens, and means actuated by the support for said lens for automatically moving said ground glass pivotally to a partially closed position.

21. In a folding camera, a casing, a falling base board, a front slidingly mounted on said base board, a lens carried by said front, a second front slidingly mounted on said base board, a plaited bellows secured at opposite ends to said fronts whereby one front may be adjusted in respect to the other front, a box formed bellows secured at one end to said second front and having the opposite end projecting into said casing, said plaited bellows being removably secured to said second front, and means on said second front for receiving a lens when said plaited bellows and said first mentioned front is removed from said base board.

22. In a camera of the class described, a housing, a bellows arranged to be folded in said housing, said bellows having a frame at its outer end, a lens carrying front formed to fit into said frame, a second bellows formed with a frame at the rear end adapted to fit the frame of the first mentioned bellows and at the forward end formed with a frame adapted to receive said lens carrying front, a shutter or curtain arranged at the rear of said housing, means arranged at the rear of said housing for supporting a sensitive member, means for adjusting said lens, and focusing means.

23. A camera comprising a housing, means for supporting a sensitive member thereon, a shutter mechanism, a lens, a folding observation hood, means for automatically unfolding said observation hood, a catch for releasing said automatic means, a foldable bellows connected at its top part to said observation hood, and means for supporting said lens on said foldable bellows, said foldable bellows and said hood being adapted to be folded into said housing.

In testimony whereof I have signed my name to this specification in the presence of two subscribing witnesses.

ANTHONY VORIS.

Witnesses:
C. L. LUEDTKE,
JAMES F. MARKEY.